United States Patent [19]

Burkhardt et al.

[11] Patent Number: 4,835,237

[45] Date of Patent: May 30, 1989

[54] PROCESS FOR PREPARING DIORGANOPOLYSILOXANES CONTAINING TRIORGANOSILOXY TERMINAL GROUPS

[75] Inventors: Jürgen Burkhardt, Winhöring; Andreas Böck, Emmerting, both of Fed. Rep. of Germany

[73] Assignee: Wacker-Chemie GmbH, Munich, Fed. Rep. of Germany

[21] Appl. No.: 176,537

[22] Filed: Apr. 1, 1988

[30] Foreign Application Priority Data

Apr. 3, 1987 [DE] Fed. Rep. of Germany ....... 3711214

[51] Int. Cl.$^4$ ............................................ C08G 77/06
[52] U.S. Cl. ...................................... 528/21; 528/23; 528/33; 556/467
[58] Field of Search .............................. 528/21, 23, 33; 556/467

[56] References Cited

U.S. PATENT DOCUMENTS 3,839,388 10/1974 Nitzsche et al. ...................... 528/23
4,725,643 2/1988 Burkhardt ............................ 524/789

Primary Examiner—Melvyn I. Marquis

[57] ABSTRACT

Diorganopolysiloxanes containing triorganosiloxy groups as terminal units are prepared by mixing the diorganopolysiloxanes which may already contain triorganosiloxy terminal groups, after they have reached the desired average viscosity by condensation and/or equilibration in the presence of catalysts other than chlorophosphazenes, with a hexaorganodisilazane in an amount of from 0.05 to 2 percent by weight, based on the weight of the diorganopolysiloxanes employed and after mixing, a catalytic amount of a chlorophosphazene is added.

2 Claims, No Drawings

PROCESS FOR PREPARING DIORGANOPOLYSILOXANES CONTAINING TRIORGANOSILOXY TERMINAL GROUPS

The present invention relates to a process for preparing diorganopolysiloxanes which contain triorganosiloxy terminal groups, and are generally substantially free of Si-bonded hydroxyl groups or of groups which are capable of condensing with such hydroxyl groups, from a diorganopolysiloxane which may already contain triorganosiloxy terminal groups, and a hexaorganodisilazane in the presence of a chlorophosphazene.

BACKGROUND OF THE INVENTION

Diorganopolysiloxanes containing triorganosiloxy groups as terminal units are usually prepared by equilibration or equilibration and condensation of cyclic and/or linear organopolysiloxanes using triorganosilanols or low-molecular-weight organosiloxanes containing triorganosiloxy groups. Such diorganopolysiloxanes containing triorganosiloxy terminal groups are used, for example, for crosslinking, i.e., curing or vulcanization in the formation of elastomers. In preparing diorganopolysiloxanes containing triorganosiloxy terminal groups by equilibration or equilibration and condensation of cyclic and/or linear organopolysiloxanes using triorganosilanols or low-molecular-weight organosiloxanes containing triorganosiloxy groups, the two terminal units of the resultant linear organopolysiloxane molecule do not always contain triorganosiloxy groups. Thus, the resultant diorganopolysiloxanes which contain Si-bonded hydroxyl groups, even in a low amount, or contain groups which are capable of condensing with such groups, when combined with reinforcing fillers form batches which may become hard or stiff on storage before final shaping and curing to form elastomers. This behavior is known, for example, as "crepe hardening". Behavior of this type can be prevented, for example, if the Si-bonded hydroxyl groups which are still present in the diorganopolysiloxanes are converted into triorganosiloxy groups.

Conversion of Si-bonded hydroxyl groups into triorganosiloxy groups by means of N-alkyl-substituted silylamines is described, for example, in U.S. Pat. No. 3,133,110 to Morehouse et al.

U.S. Pat. No. 4,725,643 to Burkhardt describes a method for preparing linear organopolysiloxanes containing triorganosiloxy groups as terminal units from linear organopolysiloxanes which contain one Si-bonded hydroxyl group in each terminal unit by condensing linear organopolysiloxanes having terminal Si-bonded hydroxyl groups in the presence of chlorophosphazene, and thereafter reacting the resultant product with hexaorganodisilazane.

It is, therefore, an object of the present invention to provide a process for preparing diorganopolysiloxanes containing terminal triorganosiloxy groups. Another object of the present invention is to provide a process for preparing diorganopolysiloxanes containing terminal triorganosiloxy groups from diorganopolysiloxanes which may already contain terminal triorganosiloxy groups after they have reached the desired mean viscosity by condensation and/or equilibration in the presence of catalysts other than chlorophosphazenes and hexaorganodisilazane and chlorophosphazenes, in which the resultant diorganopolysiloxanes are substantially free of Si-bonded hydroxyl groups or groups which are capable of condensing with the hydroxyl groups. Another object of the present invention is to provide a process for preparing diorganopolysiloxanes containing terminal triorganosiloxy units in which the hexaorganodisilazane is used in very low amounts and in the absence of another substance. Still another object of the present invention is to provide a process for preparing diorganopolysiloxanes having terminal triorganosiloxy units in which no additional agent is necessary to deactivate the chlorophosphazene and the resultant diorganopolysiloxanes do not undergo any further change in viscosity by condensation and/or equilibration as a result of the addition of the chlorophosphazene. A further object of the present invention is to provide diorganopolysiloxanes having terminal triorganosiloxy units which have a high thermal stability, are physiologically acceptable and do not discolor even at temperatures above 150° C.

SUMMARY OF THE INVENTION

The foregoing objects and others which will become apparent from the following description are accomplished in accordance with this invention, generally speaking, by providing a process for preparing diorganopolysiloxanes having terminal triorganosiloxy units which comprises mixing diorganopolysiloxanes which may contain triorganosiloxy terminal groups which have reached the desired average viscosity by the condensation and/or equilibration reaction in the presence of catalysts other than chlorophosphazenes with hexaorganodisilazane in an amount of from 0.05 to 2 percent by weight based on the weight of the diorganopolysiloxane employed and thereafter adding chlorophosphazene as a catalyst.

DESCRIPTION OF THE INVENTION

The preferred diorganopolysiloxanes used in the reaction with the hexaorganodisilazanes are those which are generally employed, for example, in the preparation of diorganopolysiloxanes that are intended for further processing to form elastomers and have been prepared by polymerization of cyclic diorganopolysiloxanes of the general formula

$(R_2SiO)_m$ in which R is a monovalent hydrocarbon radical or a substituted monovalent hydrocarbon radical, and m is an integer having a value of at least 3, and more preferably from 3 to 9, and/or by the condensation of silanols or siloxanols of the general formula

$HO(SiR_2O)_nH$ in which R is the same as above and n is an integer having a value of at least 1 in the presence of catalysts, which in the presence of Si-bonded hydroxyl groups, promote not only condensation of these hydroxyl groups, but also equilibration.

In order to keep the amount of hexaorganodisilazane employed to a minimum, it is preferred that diorganopolysiloxanes which already contain triorganosiloxy terminal groups be reacted with the hexaorganodisilazane. Therefore, it is preferred that the readily available triorganosilanols of the general formula

$R_3SiOH$ and/or low-molecular-weight organosiloxanes containing diorganosiloxy groups of the general formula $$R_3Si(OSiR_2)_pOSiR_3$$

where R is the same as above and p is 0 or an integer having the value of from 1 to 20, be used in the above-described polymerization and/or condensation process.

Although not represented by the above formula $$HO(SiR_2O)_nH$$

in which R and n are the same as above, up to a total of about 5 mol percent of the diorganosiloxane units may be replaced by other siloxane units, such as monoorganosiloxane and/or SiO$_4$ units. These are generally present as impurities which are more or less difficult to avoid.

Probably the most important examples of triorganosiloxy groups which are present in the diorganopolysiloxanes containing triorganosiloxy groups as terminal units employed in the process of this invention, and of the R$_3$SiO groups in the above formulas are the trimethylsiloxy and vinyldimethylsiloxy groups. The most important examples of triorganosilyl groups in the hexaorganodisilazanes are the trimethylsilyl and vinyldimethylsilyl groups. Since diorganopolysiloxanes which may already contain triorganosiloxy terminal units are used in the reaction with a hexaorganodisilazane, it is preferred that the triorganosilyl groups (R$_3$Si) in the two reactants be identical.

Catalysts which were known heretofore to promote condensation of hydroxyl groups and rearrangement of siloxane bonds, except for chlorophosphazenes, can be used in this invention. Examples of acid catalysts are sulfuric acid, phosphoric acid, trifluoromethanesulfonic acid, iron(III) chloride, aluminum chloride, boron trifluoride, zinc chloride and acid catalysts which are solid under the reaction conditions, such as acid-activated bleaching earths, kaolin, acid zeolites, sulfonated charcoal and sulfonated styrene-divinylbenzene copolymers. Examples of basic catalysts are alkali metal hydroxides, especially potassium hydroxide and cesium hydroxide, alkali metal alkoxides, quaternary ammonium hydroxides, such as tetramethylammonium hydroxide, benzyltrimethylammonium hydroxide, benzyltriethylammonium hydroxide, benzyltrimethylammonium butoxide and beta-hydroxyethyltrimethylammonium 2-ethylhexanoate, quaternary phosphonium hydroxides, such as tetra-n-butylphosphonium hydroxide and tri-n-butyl-3-[tris(trimethylsiloxy)silyl]-n-propylphosphonium hydroxide, alkali metal siloxanolates and ammonium organosiloxanolates, such as benzyltrimethylammonium methylsiloxanolate. These catalysts are preferably employed in an amount of from 0.01 to 1 percent by weight, based on the weight of the organosilicon compound to be polymerized or condensed.

The average viscosity of the diorganopolysiloxanes which may already contain triorganosiloxy groups and are employed in the process of this invention is preferably from $1 \times 10^2$ to $5 \times 10^7$ mPa.s at 25° C.

The radicals represented by R in the above formulas preferably contain from 1 to 18 carbon atoms per radical. Examples of hydrocarbon radicals represented by R are alkyl radicals, such as the methyl, ethyl, n-propyl, isopropyl, n-butyl, sec-butyl and octadecyl radicals; aliphatic radicals containing a carbon-carbon double bond, such as the vinyl and allyl radicals; aryl radicals, such as the phenyl radical and xenyl radicals; alkaryl radicals, such as the tolyl radical; and aralkyl radicals, such as the benzyl radical.

Examples of substituted hydrocarbon radicals represented by R are haloalkyl radicals, such as the 3,3,3-trifluoropropyl radical; haloaryl radicals, such as the o-, p- and m-chlorophenyl radicals; and cyanoalkyl radicals, such as the β-cyanoethyl radical. Due to their availability, it is preferred that at least 50 percent of the R radicals be methyl radicals. The radicals represented by R which are present in addition to the methyl radicals are usually vinyl and/or phenyl radicals.

The hexaorganodisilazane employed in the process of this invention may be represented by the formula $$[R_3^1Si]_2NH$$

where R$^1$, which may be the same or different is a monovalent hydrocarbon radical or a substituted monovalent hydrocarbon radical. The radicals represented by R$^1$ preferably also contain from 1 to 18 carbon atoms per radical. The examples cited for the R radicals also apply to the radicals represented by R$^1$.

The preferred hexaorganodisilazane is 1,3-divinyl-1,1,3,3-tetramethyldisilazane. Another important hexaorganodisilazane which can be employed in the process of this invention is hexamethyldisilazane.

The hexaorganodisilazane is employed in an amount of from about 0.05 to 2 percent by weight, and more preferably in an amount of from 0.2 to 1 percent by weight, based on the weight of the diorganopolysiloxane employed.

The chlorophosphazenes which catalyze the reaction of the remaining Si-bonded hydroxyl groups in the diorganopolysiloxanes employed in accordance with this invention into triorganosiloxy groups in the presence of a hexaorganodisilazane may be any chlorophosphazenes known heretofore as equilibration and condensation catalysts. For example, the chlorophosphazenes may be those which are prepared by reacting 400 parts by weight of phosphorus pentachloride with 130 parts by weight of ammonium chloride (cf., for example, "Berichte der Deutschen Chemischen Gesellschaft", volume 57, 1924, p. 1345) or those which can be obtained by reacting 2 moles of phosphorus pentachloride with 1 mole of ammonium chloride in accordance with the procedure described, for example, in U.S. Pat. No. 3,839,388 to Nitzsche et al. Of course, it is also possible to use mixtures containing at least two different types of chlorophosphazenes.

The chlorophosphazene is preferably used in an amount of from 5 to 100 ppm by weight, and more preferably from 20 to 80 ppm by weight, based on the weight of the diorganopolysiloxane employed.

The time between the addition of the hexaorganodisilazane to the diorganopolysiloxane and the addition of the chlorophosphazene is preferably from 2 to 10 minutes, and the reaction is complete in from 20 to about 120 minutes.

If fillers are employed, those having a BET surface area of at least 50 m$^2$/g are added to the diorganopolysiloxane, preferably in an amount up to about 1 percent by weight, based on the weight of the diorganopolysiloxane employed.

The temperature used in the process of this invention is preferably from 20° to 200° C., and more preferably from 100° to 150° C.

The process of this invention is preferably carried out under the pressure of the ambient atmosphere, i.e., at 1020 hPa (abs.) or about 1020 hPa (abs.), but may be carried out at elevated or reduced pressures.

The process of this invention may be carried out batchwise, semi-continuously or as a continuous process. It is preferably carried out as a continuous process.

The ammonia formed during the reaction of Si-bonded hydroxyl groups with hexaorganodisilazane to form triorganosiloxy groups deactivates the chlorophosphazene used as a catalyst for this reaction.

The diorganopolysiloxanes containing triorganosiloxy terminal groups prepared according to this invention can be used for all purposes which diorganopolysiloxanes containing triorganosiloxy terminal groups have been used heretofore. They may be used, for example, as filament lubricants, for preparing organopolysiloxane elastomers which are crosslinked by means of free-radical formers or by the addition reaction of SiC-bonded vinyl groups with Si-bonded hydrogen, and for preparing coatings containing adhesive substances.

The chlorophosphazene used in the examples was prepared in the following manner:

A mixture containing 417 g (2 mol) of phosphorus pentachloride and 53.3 g (1 mol) of ammonium chloride in 1,000 ml of tetrachloroethane is refluxed for 12 hours. The volatile components are removed from the resultant pale, yellow solution at 160° C. by reducing the pressure to the 1.33 hPa (abs.). Yellowish crystals consisting essentially of a compound of the formula $Cl_3PNPCl_2NPCl_3 \cdot PCl_6$ were obtained as residue.

EXAMPLE (a) A mixture containing 300 g of octamethylcyclotetrasiloxane and 2 g of trimethylsiloxy-terminated dimethylpolysiloxane having 65 siloxane units per molecule and 0.2 ml of benzyltrimethylammonium siloxanolate (prepared from benzyltrimethylammonium hydroxide and octamethylcyclotetrasiloxane) is kneaded for 45 minutes at 80° C. in a laboratory kneader. The catalyst is subsequently deactivated by kneading for 20 minutes at 180° C. and at a pressure of 10 hPa. The product thus obtained has a value of 5,500 Nm, determined in a Brabender Plastograph at 25° C. and a speed of 60 revolutions per minute.

(b) A sample of the product obtained in accordance with (a) above is mixed with 1 percent by weight based on the weight of the sample of a mixture containing equal parts by weight of di-n-butyltin dilaurate and tetra(methoxyethyleneoxy) silicate. After the resultant mixture has been allowed to stand overnight at room temperature, it formed an elastomer. This shows that Si-bonded hydroxyl groups were still present in the sample.

(c) About 2 g of hexamethyldisilazane and about 5 minutes later, 60 ppm by weight of chlorophosphazene as a 25 percent strength solution in 1,2,3-trichloropropane are kneaded into about 300 g of the product prepared in accordance with the procedure described in (a) above at 150° C. The mixture is then kneaded for an additional 1 hour at 150° C. The test described in (b) above is negative, i.e., the dimethylpolysiloxane thus obtained containing trimethylsiloxy groups as terminal units is free of Si-bonded hydroxyl groups. The dimethylpolysiloxane treated in accordance with (c) above has the same Brabender Plastograph value as that obtained in (a) above. The molecular weight distribution as determined by means of gel permeation chromatography of the dimethylpolysiloxane treated in accordance with (c) above is the same as that of the untreated dimethylpolysiloxane whose preparation is described in (a) above.

COMPARISON EXAMPLE

The procedure described in (c) above is repeated, except that 2 g of hexamethyldisilazane is kneaded at 150° C. into 300 g of the product prepared in accordance with the procedure described in (a) above, except that the chlorophosphazene was omitted. The mixture is then kneaded for an additional one hour at 150° C. The test described in (b) above is positive, i.e., Si-bonded hydroxyl groups are present in the resultant dimethylpolysiloxane when the chlorophosphazene is omitted.

What is claimed is:

1. A process for preparing diorganopolysiloxanes containing triorganosiloxy terminal units which comprises reacting diorganopolysiloxanes containing triorganosiloxy groups, Si-bonded hydroxyl groups or groups capable of condensing with such groups with a hexaorganodisilazane by mixing the diorganopolysiloxanes with a hexaorganodisilazane in an amount of from 0.05 to 2 percent by weight, based on the weight of the diorganopolysiloxanes employed, and thereafter adding a chlorophosphazene as a catalyst, wherein the diorganopolysiloxanes employed are obtained from the reaction of a diorganopolysiloxane selected from the group consisting of a cyclic diorganopolysiloxane of the general formula $(R_2SiO)_m$, a diorganopolysiloxane of the general formula $HO(SiR_2O)_nH$ and mixtures thereof, in which R is a monovalent hydrocarbon radical or a substituted monovalent hydrocarbon radical, m is an integer having a value of at least 3 and n is an integer having a value of at least 1, with a silicon compound selected from the group consisting of a triorganosilanol of the general formula $R_3SiOH$, a low-molecular-weight organosiloxane of the general formula
$R_3Si(OSiR_2)_pOSiR_3$
and mixtures thereof, where R is the same as above and p is 0 or an integer having a value of from 1 to 20, in the presence of a catalyst other than chlorophosphazenes.

2. The process of claim 1, wherein the hexaorganodisilazane is 1,3-divinyl-1,1,3,3-tetramethyldisilazane.

* * * * *